United States Patent [19]
Foreman et al.

[11] Patent Number: 4,744,136
[45] Date of Patent: May 17, 1988

[54] PROCESS FOR MANUFACTURING END WEIGHTED BATS

[75] Inventors: Ronald Foreman, Narberth; Anthony Daddario, Limerick, both of Pa.

[73] Assignee: Ten Pro Corporation, Pheonexville, Pa.

[21] Appl. No.: 931,144

[22] Filed: Nov. 17, 1986

Related U.S. Application Data

[63] Continuation-in-part of Ser. No. 791,371, Oct. 22, 1985, abandoned, which is a continuation of Ser. No. 556,450, Nov. 30, 1983, abandoned.

[51] Int. Cl.$^4$ .............................................. B23P 11/02
[52] U.S. Cl. ......................................... 29/451; 29/453; 273/72 A
[58] Field of Search ......................... 29/451, 453, 235; 273/72 R, 72 A

[56] References Cited

U.S. PATENT DOCUMENTS

| | | | |
|---|---|---|---|
| 1,830,814 | 11/1931 | Thiry | 29/235 X |
| 2,457,930 | 1/1949 | Smith | 29/235 |
| 2,856,677 | 10/1958 | Rekettye | 29/235 X |
| 3,479,030 | 11/1969 | Merola | 273/72 A |
| 3,703,290 | 11/1972 | Wilson | 273/72 A |
| 3,729,196 | 4/1973 | Heald, Jr. | 273/72 A |
| 3,793,699 | 2/1974 | Merola | 29/451 X |
| 3,834,698 | 9/1974 | Pouzou | 273/72 A |
| 3,841,130 | 10/1974 | Scott, Jr. et al. | 273/72 A X |

*Primary Examiner*—Charlie T. Moon
*Attorney, Agent, or Firm*—Steele, Gould & Fried

[57] ABSTRACT

A method for manufacturing a baseball or softball bat formed of hollow metal tubing having a short weight plug of hard rubber anchored at the extreme end of the striking portion of the bat by a knob protruding from the weight plug through a hole in the end of the bat including inserting the weight plug in the tubing prior to forming the end of the bat, partially closing the end of the bat and forming a hole, positioning the plug by gas pressure developed within the hollow of the bat and forcing the knob through the end hole.

14 Claims, 2 Drawing Sheets

PROCESS FOR MANUFACTURING END WEIGHTED BATS

RELATED APPLICATION

This application is a continuation-in-part of application Ser. No. 791,371 filed Oct. 22, 1985, now abandoned, which is a continuation of application Ser. No. 556,450, filed Nov. 30, 1983, now abandoned.

BACKGROUND OF THE INVENTION

1. Field of the Invention

This invention relates to the field of bats for use in ball games, and more particularly, to hollow metal bats having weighted end plugs and the process for manufacturing the bats.

2. Description of the Prior Art

A number of devices for affecting the weight distribution and/or vibration characteristics of bats and clubs are known in the art. In U.S. Pat. No. 4,241,919-Foreman, an aluminum baseball bat comprises a rubber plug at the extreme end of the striking portion of the bat. Gas pressure is varied with the hollow of the bat, behind the rubber plug, to control the vibration characteristics.

In U.S. Pat. 3,479,030-Merola, a rubber plug inserted in the end of a bat includes an enlargement which extends over the open end of the striking portion of the bat in a manner to form a smooth contour. The body of the Merola plug, however, is tapered such that the diameter is largest adjacent the end of the bat, and less towards the inside of the bat.

In U.S. Pat. No. 3,727,295-Gildmeister, an end plug is threadably attached to a metal bat having a foam-filled interior, and a flanged end extends over the metal. Although Gildmeister alternatively discloses a system of ridges for holding the rubber plug in the end of the bat, each of the foregoing references rely upon an adhesive connection between the plug and the hollow bat in order to maintain a plug in place. Foreman further discloses spinning the metal at the end of the bat to completely close the end over the solid plug. In the prior Foreman construction, there was no way to assure that the plug was actually positioned at the end of the bat. In fact, experience has proved that the spinning operation tended to force the plug away from the end of the bat.

SUMMARY OF THE INVENTION

It is an object of the invention to provide a process for placing a weight within a hollow metal bat as close as practicable to the extreme end of the bat.

It is also an object of the invention to lock a rubber weight plug at the end of the bat without need for adhesives or an impractically tight fit.

It is another object of the invention to provide a process for achieving the maximum inertial effect per unit of weight in an inexpensive, conveniently constructed bat.

It is yet another object of the invention to provide a process for achieving all the foregoing objects in a bat which is both inexpensive and durable.

These and other objects are accomplished by providing a process for preparing a bat comprising a hollow metal tube having a handle section to be grasped by a user and a striking section to be swung against the ball, the tube being partially closed at the end of the striking section to define an end hole; and, a weight plug of resilient material dimensioned to fit securely within the striking section, the plug having a protruding knob extending through the end hole and the knob having a portion of larger diameter than the said end hole, the portion serving to anchor the weight plug at the extreme end of the striking section.

The weight plug employed in accordance with the present invention is short and is also frictionally held in position. The bat is formed by forcing the weight plug with its integral protruding knob into the open end of a hollow bat. By spinning the open end in known manner to partially close the end of the bat, an open end hole of reduced diameter can be defined. Then, by forcing the weight plug to the end of the bat, and the protruding knob through the end hole, by developing gas pressure, preferably utilizing compressed air, in the hollow of the bat behind the plug, the positioning of the weight plug at the extreme end of the bat by spinning provides a bat construction wherein it is impossible for the weight plug to separate from the metallic portion of the bat.

More particularly, the process of the invention comprises the steps of 1. forming a hollow metal tube,
2. placing a resilient and compressible weight plug having a knob portion protruding therefrom into the tube and moving the plug toward the striking end of the tube,
3. forming the bat configuration and partially closing the striking end of the tube to define an end hole smaller than the protruding knob,
4. providing a stream of inert gas within the tube so as to create pressure to cause the plug to move through the tube, and
5. causing the knob portion to be pushed through the end hole by the gas pressure.

The placement of the weight within the body of a bat has a major effect upon the usefulness thereof in hitting balls. Traditionally, the weight distribution of bats was regulated by controlling the diameter of a homogeneous material such as wood. With hollow metal bats, the weight distribution of the bat can be controlled by use of various materials positioned within the hollow metal tube. It will be appreciated that placing a weight at the extreme end of the bat will produce a moving body of greater inertia than the same weight placed closer to the center of the arc of swing. Placing such a weight at the extreme end of a bat, however, requires a means of securely attaching the same to the bat to prevent unintentional disassociation of the parts.

Solid rubber plugs to be positioned within hollow bodies such as hollow metal bats are normally dimensioned slightly larger than the hollow body such that the fit is snug and the plug remains in position through frictional engagement. The security of such a resilient frictional connection is related to the surface characteristics of the interior periphery of the tube and the exterior periphery of the plug. Additionally, the compression of the resilient member as well as the surface area over which a resilient frictional connection is maintained will further affect security. In other words, the longer the resilient plug is designed, or the more the resilient plug is compressed within the tube, the better will be the connection between the plug and the metallic portion of the bat.

A longer rubber plug therefore has the advantages of a larger surface to surface contact the inner periphery of the hollow tube. The longer plug has the inherent disadvantage that its center of mass is necessarily located farther from the end of the bat than a shorter plug of greater weight. Therefore, a means of securely connecting a weight plug at the extreme end of the striking portion of a bat will have the effect of allowing secure placement of a plug at a position which will achieve the maximum inertia and swinging force per unit of weight. According to the present invention, by partially spinning closed the end of a bat, after inserting a rubber plug of the disclosed design, a short, heavy, solid rubber plug can be located at the extreme end of the bat. Adhesives are not required because the plug is forced to the end of the bat and then is locked into position by gas pressure developed within the hollow of the bat, behind the plug. The overall effect is a light-weight bat that maximizes the inertial effect of a solid rubber plug, without need for adhesives or an unduly tight fit between the rubber plug and the inner surface of the bat.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
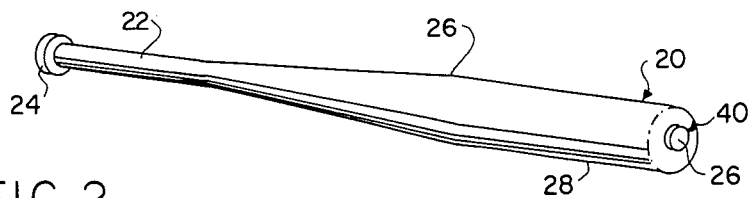
FIG. 1 is a perspective view of a bat according to the present invention.

As seen in FIG. 1, the bat 20 of the invention is externally similar to the prior art bats used in baseball and softball games, and other ball games. Bat 20 is adapted to be grasped by a user at handle section 22, which has a diameter chosen for comfortable grasping, for example, approximately one and one-quarter inches (three centimeters). An enlarged knob end 24 is placed on the end of the bat at the handle section, as is also traditional. Knob 24 prevents the bat 20 from slipping from the user's grip. Other means of improving the surface of handle 22, such as taping or enclosing in a sleeve or tacky material, may be employed, in known manner.

In swinging the bat, the user attempts to bring the striking portion 28 into contact with a pitched ball. Striking portion 28 is of somewhat larger diameter than the handle section 22, and is connected to the handle section 22 across a tapered intermediate portion 26. Striking portion 28 is of larger diameter in order to present a larger cross-section, thereby improving chances of hitting the ball, and also to affect the weight characteristics of the bat. As noted above, in homogeneous material such as wood, the dimensioning of the striking portion 28 would be the only means of affecting the weight characteristics of the bat. The present invention, however, comprises a hollow tube, for example, of a light-weight metal such as aluminum, the weight characteristics being determined by the quantity of metal, and also by an inserted weight plug.

Figure 2:
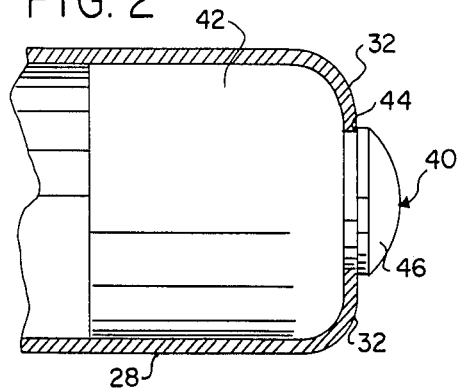
FIG. 2 is an enlarged, cut-away sectional view of the extreme end of the striking portion of the bat of FIG. 1.

As shown in FIG. 2, the weight plug 40 is adapted to be positioned at the extreme end of the bat 20. A protruding portion 46 physically locks the body 42 of the plug 40 at the extreme end of the bat 20 at the end of the striking portion 28.

Figure 3:
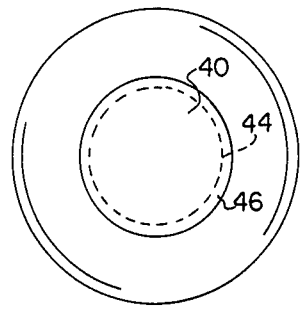
FIG. 3 is an end elevational view of the bat of the present invention.

The body 42 of the plug 40 is complementarily shaped to fit snugly within the walls comprising the striking portion 28. As shown in FIG. 3, the cross-section of the bat 20 preferably may be round. The invention is also applicable to cross-sections of other design, for example, the flattened oval cross-section characteristic of bats used in cricket. In any event, the plug 40 is less than three inches long and fits tightly within the hollow tube, and is locked in position at the end of the bat.

It is preferred that the weight plug of the invention be made of a hard, dense rubber material. Such a material is resilient, but is not easily compressed. In order to cause the plug 40 to fit tightly within the striking portion 28, it is presently preferred that the dimensions of the body 42 of the plug 40, when at rest, be approximately 0.030 inches (0.08 cm.) larger than the inner diameter of the inner dimension of the striking section 28 of the bat 20. The diameter of the plug can exceed the diametrical dimension within the tube by 0.020 to 0.040 inches (0.05 to 0.10 cm.), the middle of that range being a reasonable compromise between the need for compressing the plug within the tube and the need for allowing a means of displacing the plug longitudinally during construction of the bat.

Figure 4:
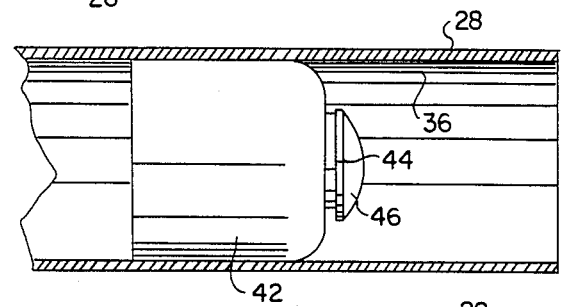
FIG. 4 is a cut-away sectional view showing an intermediate stage in production of the bat of the present invention.

With reference to FIG. 4, the bat 20 is initially constructed with the tube 28 being a straight section of tubing, that is, simply cut perpendicular to the axis of the tube. The plug 40 is forced into the end of the tube, the body 42 of plug 40 being compressed as necessary to conform to the inner surface 36 of the tube 28 when the plug is inserted. The compression of the body 42 of the plug 40 thereby causes a frictional attachment between the plug 40 and the bat 20. Plug 40 is inserted sufficiently to be clear of the extreme end of the bat during this stage of production.

Having inserted the plug 40 as illustrated in FIG. 4, end radius 32 is formed by spinning down the tubing at the end of striking section 28. See FIG. 5. Spinning down the end of the tubing is commonly used to completely close the ends of hollow metal bats. However, in accordance with the invention, the tubing is only partially spun, leaving a hole 34 at the extreme end of bat 20, and in particular, in the end of the striking section 28. The hole 34 may be trimmed or deburred, if necessary, after the end of bat 20 is spun down to form the radiused corners 32.

Figure 5:
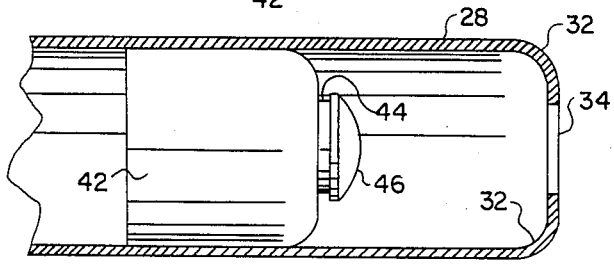
FIG. 5 is a cut-away sectional view showing a later intermediate stage.
Figure 6:
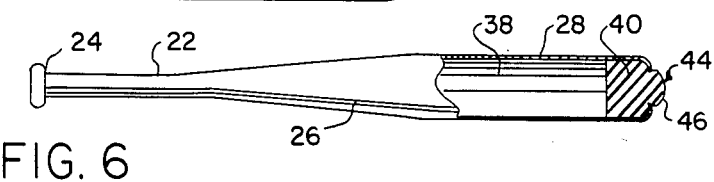
FIG. 6 is a side elevation view of the bat of FIG. 1., partially broken away to show interior construction features.

Having been spun down, the inner dimensions of the end of striking section 28 are exactly complementary to the external dimensions of plug 40. It would presumably be possible to spin down the end of the bat to cause rounded corners 32 to rest directly against the rubber plug. It is presently preferred that the spinning be done clear of the rubber plug, and the plug thereafter be moved to the end of the bat to lock into the end hole 34. Preferably, gas under pressure is utilized for this purpose. As shown in FIG. 5, the plug may be moved a substantial distance back from the end of the bat during fabrication. A shorter distance will also suffice.

The protruding knob 46 of the rubber plug 40, is connected to the plug 40 by means of a short shaft 44 and is fabricated to be somewhat larger than the internal dimension of the end hole 34. Accordingly, the knob 46 is compressed as necessary as it passes through the end hole 34 as a result of the pressure on the plug 40 and the end wall acting on the knob 46. After having been passed through the opening 34, knob 46 will expand to its original rest dimensions, thereby locking the position of the rubber plug at the extreme end of the bat. In particular, the walls of the striking section 28 adjacent to the end hole 34 are enclosed between the body 42 and the knob 46 of the plug 40. Accordingly, once it has been positioned, the plug 40 cannot be displaced either inwardly or outwardly.

The knob 46 is preferably carried on a shaft 44, which shaft is of a length exactly equal to the thickness of the walls of striking section 28 adjacent to the end hole 34. It is also possible to form the protrusion or knob as a simple cylindrical extension, the protrusion expanding beyond the walls of striking section 28 adjacent the end hole 34, to similarly lock the plug in position.

It is presently preferred that the flanged protrusion shown in the drawings be used rather than a simple cylindrical protrusion. The rounded contour of the protrusion 46 facilitates the interlocking of protrusion 46 with end hole 34, and also tends to present a cushioned end for the bat which prevents damage, especially at corners 32. In the rough handling of regular use, bat 20 may be expected to be dropped on the end holding the plug. Such impact is received on the rounded button on the end of protrusion 46, without damage to the bat.

Figure 7:
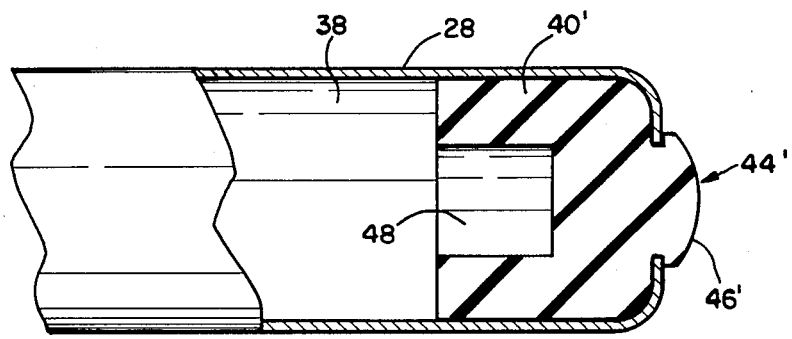
FIG. 7 is a partial, side elevational view of the bat of FIG. 1 with a recessed plug, and partially broken away to show interior construction features.

FIG. 7 shows the bat 20 with an inserted plug 40' having a protruding knob 46' connected to the plug 40' by a short shaft 44', as illustrated, the plug 40' is formed with a hollow recess 48 in the rear portion, which recess is rearwardly upon. The recess 48 has been found to be advantageous in providing a larger surface area for air pressure to act upon the plug to move it up through the bat 20 so as to force the knob 46' through the end hole 34. The recess 48 may take any form so long as the surface area is increased and the pressurized air is prevented from escaping around the plug 40'.

The invention having been disclosed, variations will now become apparent to persons skilled in the art. Reference should be made to the appended claims rather than the foregoing specification as indicating the true scope of the invention.

What is claimed is:

1. A method of making bats having a striking section for use in ball games, comprising the steps of:
    forming a hollow metal tube;
    placing a resilient and compressible weight plug into the tube, the weight plug having a resilient body, the body being dimensioned larger than the internal dimension of the hollow metal tube, the weight plug having a knob protruding therefrom toward a first end of the tube;
    partially closing the first end of said tube and defining an end hole therein that is smaller than the protruding knob; and
    directing a stream of pressurized gas against the weight plug opposite the knob to force the weight plug against the partially closed first end, and to force the said knob through the said end hole.

2. The method of claim 1, wherein air pressure is developed within said tube and the weight plug is forced against the partially closed end by said gas pressure.

3. The method of claim 1, wherein the knob is carried on a shaft dimensioned substantially the same as the end hole.

4. The method of claim 1, wherein the tube and plug are cylindrical, the partially closed end section being rounded and the weight plug being complementarily rounded to fit at the extreme end of the striking section.

5. The method of claim 1, wherein the weight plug is substantially shorter than the length of the striking section, the center of mass of the weight plug being located immediately adjacent the end of the striking section.

6. The method of claim 1, wherein the protruding knob comprises an enlargement and a shaft, the shaft being dimensioned to fit tightly in the end hole and the enlargement extending over the end of the striking section adjacent the end hole after protrusion therefrom.

7. The method of claim 4, wherein the enlargement is rounded to form a resilient button, said button protecting the partially closed end from damage.

8. The method of claim 1, wherein said plug is a solid mass of hard rubber.

9. The method of claim 1, wherein the striking section is formed of aluminum tubing.

10. The method of claim 6, wherein the outer diameter of the plug is larger than the inner diameter of the tube by 0.020 to 0.040 inches, whereby the plug is compressed when placed within the tube.

11. The method of claim 8, wherein the body of the plug is less than three inches long.

12. The method of claim 1 wherein the end of the plug upon which the gas contacts is recessed.

13. The method of claim 1 and the additional step of forming a hollow recess in the weight plug opposite the knob.

14. The method of claim 13 and contacting the hollow recess with the pressurized gas.

* * * * *